United States Patent
Silk et al.

(10) Patent No.: US 7,466,747 B2
(45) Date of Patent: Dec. 16, 2008

(54) METHOD AND APPARATUS FOR WIRELESS DATA TRANSFER

(75) Inventors: S. David Silk, Barrington, IL (US); Jeffrey A. Dykstra, Palatine, IL (US); Bruce C. Eastmond, Downers Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 591 days.

(21) Appl. No.: 11/004,714

(22) Filed: Dec. 3, 2004

(65) Prior Publication Data

US 2005/0135504 A1  Jun. 23, 2005

Related U.S. Application Data

(60) Provisional application No. 60/531,476, filed on Dec. 19, 2003.

(51) Int. Cl.
*H04B 1/38* (2006.01)

(52) U.S. Cl. ........................ 375/220; 375/302; 375/320; 375/355; 375/322

(58) Field of Classification Search ................ 375/302, 375/320, 355, 322, 220
See application file for complete search history.

(56) References Cited

U.S. PATENT DOCUMENTS

| 5,341,371 | A | 8/1994 | Simpson | |
|---|---|---|---|---|
| 5,692,014 | A | * | 11/1997 | Basham et al. ............... 375/326 |
| 6,025,945 | A | | 2/2000 | Nyu et al. |
| 6,389,081 | B1 | * | 5/2002 | Shimizu et al. ............. 375/308 |
| 2004/0190645 | A1 | * | 9/2004 | Critchlow et al. ........... 375/316 |
| 2005/0130597 | A1 | * | 6/2005 | Li et al. .................... 455/67.11 |

* cited by examiner

*Primary Examiner*—Shuwang Liu
*Assistant Examiner*—Kabir A Timory

(57) ABSTRACT

A method and apparatus for wirelessly transmitting data between two devices (101. 102) is provided herein. During data transmission, a data and a strobe signal are transmitted simultaneously on the I and Q-channels, respectively, of over-the-air interface. More particularly, QPSK modulation is utilized, with the strobe signal being transmitted via the I-channel, and the data signal being transmitted via the Q channel, (or vice versa). Additionally, illegal constellation transitions are utilized to signal the transmission of control information.

7 Claims, 7 Drawing Sheets

400

METHOD AND APPARATUS FOR WIRELESS DATA TRANSFER

FIELD OF THE INVENTION

The present invention relates generally to transferring data from one device to another, and in particular, to a method and apparatus for wirelessly transferring data from one device to another.

BACKGROUND OF THE INVENTION

Many electronic devices are designed to interface with each other for purposes of data transfer and/or control. Most interfaces between devices comprise wired connections. For example, a typical download of pictures from a digital camera to a personal computer (PC), or a typical transfer of music from a PC to a digital music player takes place over a wired connection. Thus, in order to transfer data between devices, a user will typically be required to connect a cable to each device prior to transferring the data. The task of connecting cables to each device can become cumbersome. For example, oftentimes a user will have to access the back of a PC in order to connect the cable to the PC. Additionally, an individual who transfers data among several devices will typically be required to carry the data-transfer cable along with the electronic device. Because of these issues, more and more electronic devices are being designed to wirelessly transfer data. Therefore, a need exists for a method and apparatus to wirelessly transfer data from one device to another.

DETAILED DESCRIPTION OF THE DRAWINGS

In order to address the above-mentioned need, a method and apparatus for wirelessly transmitting data between two devices is provided herein. During data transmission, a data and a strobe signal are transmitted simultaneously on the I and Q-channels, respectively, of over-the-air interface. More particularly, QPSK modulation is utilized, with the strobe signal being transmitted via the I-channel, and the data signal being transmitted via the Q-channel, (or verse visa).

Data-Strobe encoded QPSK sufficiently reduces the peak-to-average ratio performance to permit the use of a non-linear power amplifier (PA) without undue spectral spreading and approaches the constant envelope performance of a minimum-shift keyed (MSK) transmitted signal without the added circuit complexity required to implement MSK.

Figure 1:
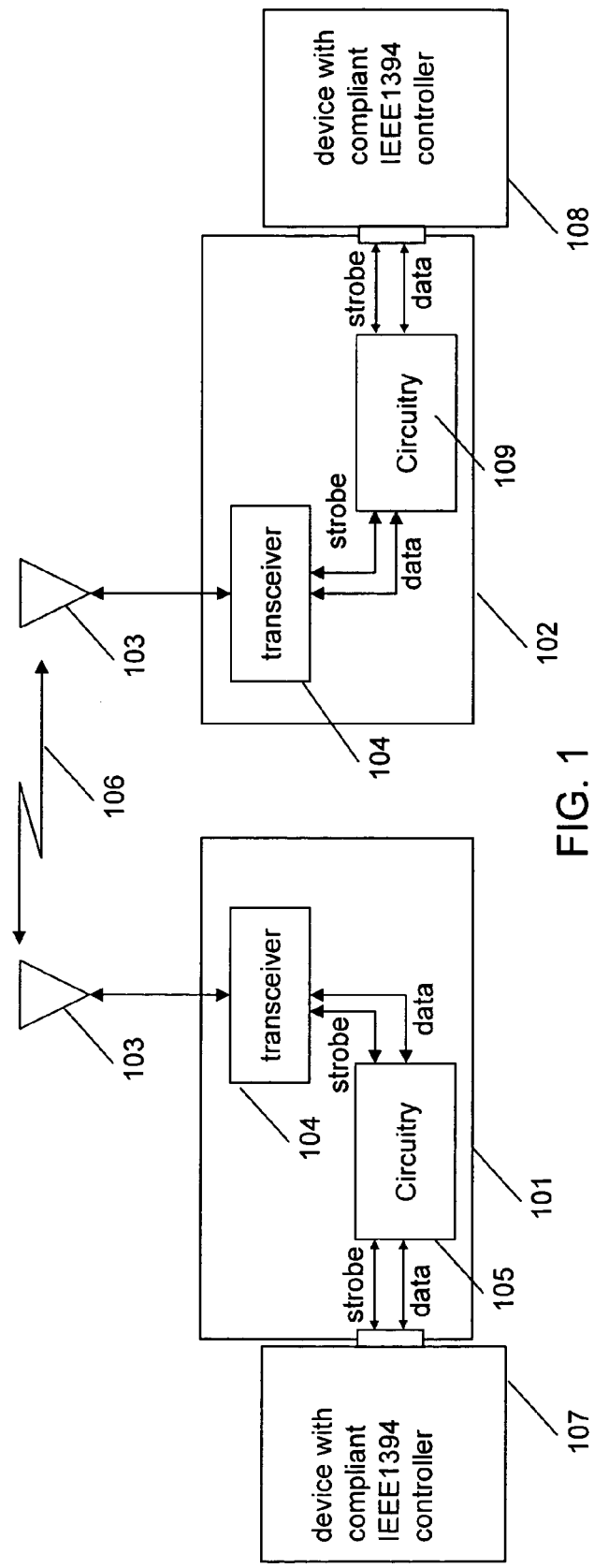
FIG. 1 is a block diagram of two electronic devices wirelessly transferring data between each other.

Turning now to the drawings, wherein like numerals designate like components, FIG. 1 is a block diagram of wireless cable replacement devices 101 and 102 to wirelessly transfer data between devices 107 and 108. In the preferred embodiment of the present invention electronic device 107 comprises a personal computer, while electronic device 108 comprises a cellular telephone capable of running an application that renders digital content. For example, device 108 may comprise a Motorola A830 cellular telephone equipped to play an MPEG Video Layer 4 file with a standard MPEG video codec. In alternate embodiments device 107 and 108 may comprise other devices such as, but not limited to personal digital assistants, portable players, hand held computers, . . . , etc. For example, device 108 may be a personal digital assistant equipped with circuitry to "play" an MPEG Audio Layer 3 (MP3) file with an application such as a standard MP3 player, while device 107 comprises a personal computer equipped with circuitry such as disk drives, random access memory, processors, . . . , etc. Other possible embodiments for devices 107 and 108 include, but are not limited to digital cameras, digital video recorders, personal digital assistants, . . . , etc.

Regardless of the form that digital devices 107 and 108 take, each device is attached to wireless cable replacement devices 101 and 102 that comprise antenna 103 and transceiver 104. Both antenna 103 and transceiver 104 serve to wirelessly transfer data between cable replacement devices 101 and 102 via over-the-air interface 106. Data transferred between cable replacement devices 101 and 102 may include such things as music, games, video, pictures, books, maps, software, . . . , etc. In the preferred embodiment of the present invention over-the-air interface utilizes a modified IEEE 1394 data transfer protocol, however, in alternate embodiments of the present invention data may be transferred between cable replacement devices 101 and 102 utilizing other modified system protocols, such as, but not limited to other cabled system protocols.

Figure 2:
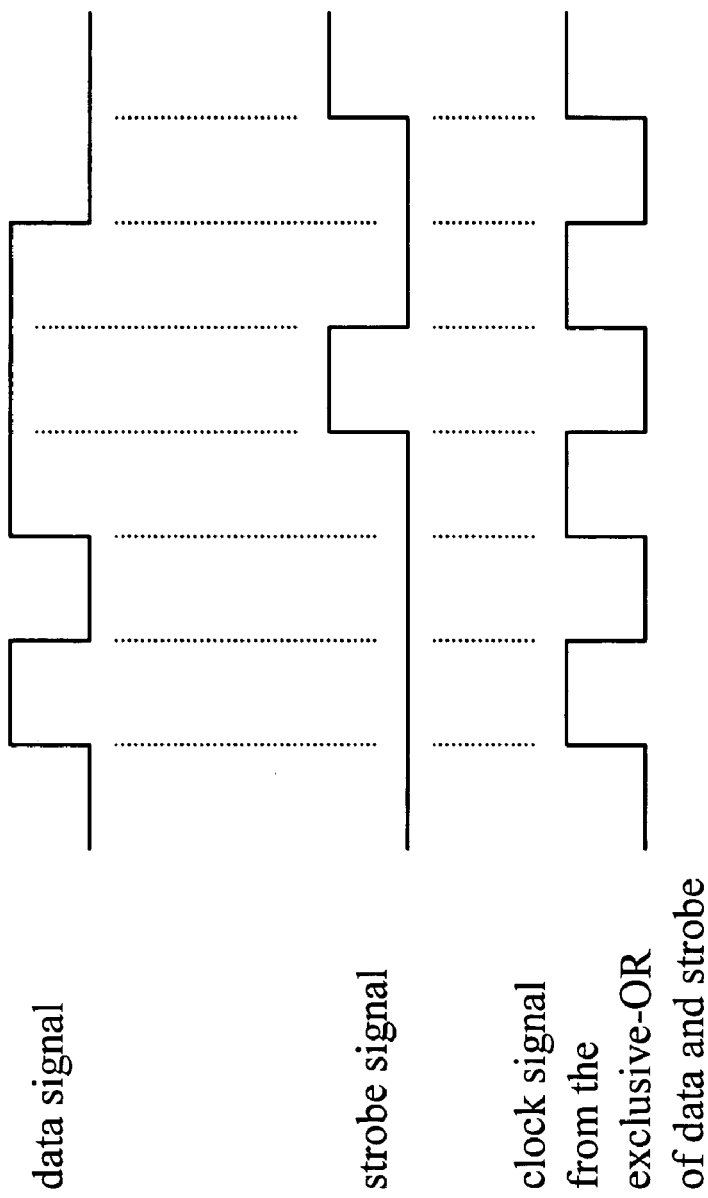
FIG. 2 illustrates strobe, data, and clock signals.

The IEEE1394a Standard employs two twisted-pair wire lines for transmitting NRZ data and strobe signals. Data is transmitted on the Data line in a serial format. An exclusive-OR of the Data with the Data Clock, is transmitted on the Strobe line in a serial format. As a result signal transitions occur on the Strobe line following the absence of a signal transition on the Data line. Hence, only one of the two signal lines changes state during each bit period. A benefit of the Data-Strobe encoding method is that the Data Clock signal may be extracted at the receiver from the exclusive-OR of the Data and Strobe signals as shown in FIG. 2. Hence, data detection can be self-clocking.

As discussed above, in order to transfer data between two devices using the IEEE1394a standard, a user will be required to connect a cable to each device prior to transferring the data. In order to address this issue, cable replacement devices 101 and 102 are designed to wirelessly transfer IEEE1394a data between each other. In particular, in the preferred embodiment of the present invention, the data and strobe signals are transmitted simultaneously on the I and Q-channels of over-the-air interface 106. More particularly, the strobe signal is transmitted via the I-channel, while the data signal is transmitted via the Q-channel, or vice versa.

During normal transmission of strobe and data signals, it is not permitted to have both the strobe and the data signal change value simultaneously from one bit to the next. It is also not permitted for both the strobe and data to remain fixed from one clock cycle to the next. For example, if the data changes from a 1 to a 0, the strobe must remain unchanged. Because of this, the I and Q constellation origin crossings at the output of the modulator are eliminated and only constellation transitions to neighboring points are permitted. This is illustrated in FIG. 3.

Figure 3:
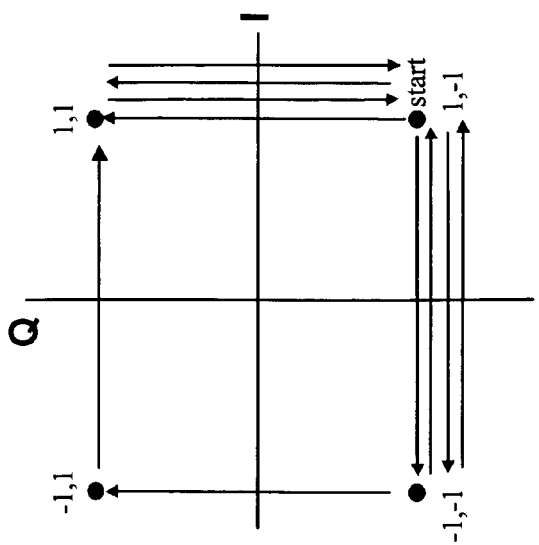
FIG. 3 illustrates proper constellation transitions.

As shown in FIG. 3, an example of the actual data transmitted is 1111100110101. This is transmitted between cable replacement devices 101 and 102 on the I-channel utilizing QPSK modulation. As discussed above, the strobe channel will be sent out via the Q-channel and comprises 0101001100000. As is evident, only the data or the strobe values change from one clock cycle to the next. One major benefit of combining Data-Strobe encoding with a QPSK modulator is that the peak-to-average ratio of the resulting transmit signal envelope is sufficiently low that a saturated PA may be used without undue spectral spreading.

As discussed above, transceivers 104 preferably use QPSK modulation, however, one of ordinary skill in the art will recognize that other modulation techniques may be utilized. For example, transceivers 104 may advantageously employ any of QPSK/QAM, minimum shift keying (MSK), or Gaussian minimum shift keying (GMSK) modulation formats. In prior art I-Q modulators, a serial stream is typically converted into two parallel half-rate streams; for example, by grouping the even bits onto the I-channel and the odd bits onto the Q-channel. This serial to parallel conversion improves the system bandwidth efficiency. Data-Strobe encoding trades bandwidth efficiency for the use of a reduced complexity clock recovery circuit in the receiver by exploiting the "redundant" exclusive-OR encoded data on the orthogonal channel. A similar bandwidth efficiency trade-off occurs in Manchester encoding; however, Manchester encoding exhibits a 180-degree phase ambiguity problem, while Data-Strobe encoding does not. Since the Strobe Signal on the orthogonal channel is for the most part redundant information, the throughput is half that of a conventional encoded QPSK system. In other words, Data-Strobe encoded QPSK achieves twice the symbol rate of a MSK system operating at the same effective data rate and system bandwidth. Data-Strobe encoded QPSK sufficiently reduces the peak-to-average ratio performance to permit the use of a non-linear PA without undue spectral spreading and approaches the constant envelope performance of a MSK transmitted signal without the added circuit complexity required to implement MSK. At the higher data rates, the linearity and balance requirements of the baseband circuitry for MSK are not trivial.

In prior-art, wired transmission of data between devices 101 and 102, DC signals are employed to indicate device attachment/detachment, the signaling rate for data exchange, and suspend/resume modes. In the preferred embodiment of the present invention the cable is no longer present to provide the DC connection. In order to address this issue, data-strobe encoding can be exploited by intentionally transmitting illegal constellation transitions that are used to signal a pending exchange of interface management/control information. For example a command can be sent to instruct the transceivers to change operating frequency. Such a command would first be preceded by a series of illegal constellation transitions, which would indicate to the receiver that a transceiver management command is to follow. As shown in FIG. 3, constellation origin crossings and remaining at a fixed point in the constellation is illegal. Thus, in the preferred embodiment of the present invention an error circuit or absence determiner circuit is utilized by transceivers 104 to prevent illegal constellation transitions and transceiver management information from reaching 107 and 108. Furthermore, the error circuit can also be disabled during normal communication and enabled after "End of Data" is detected so that corrupted data does not false the error circuit.

Figure 4:
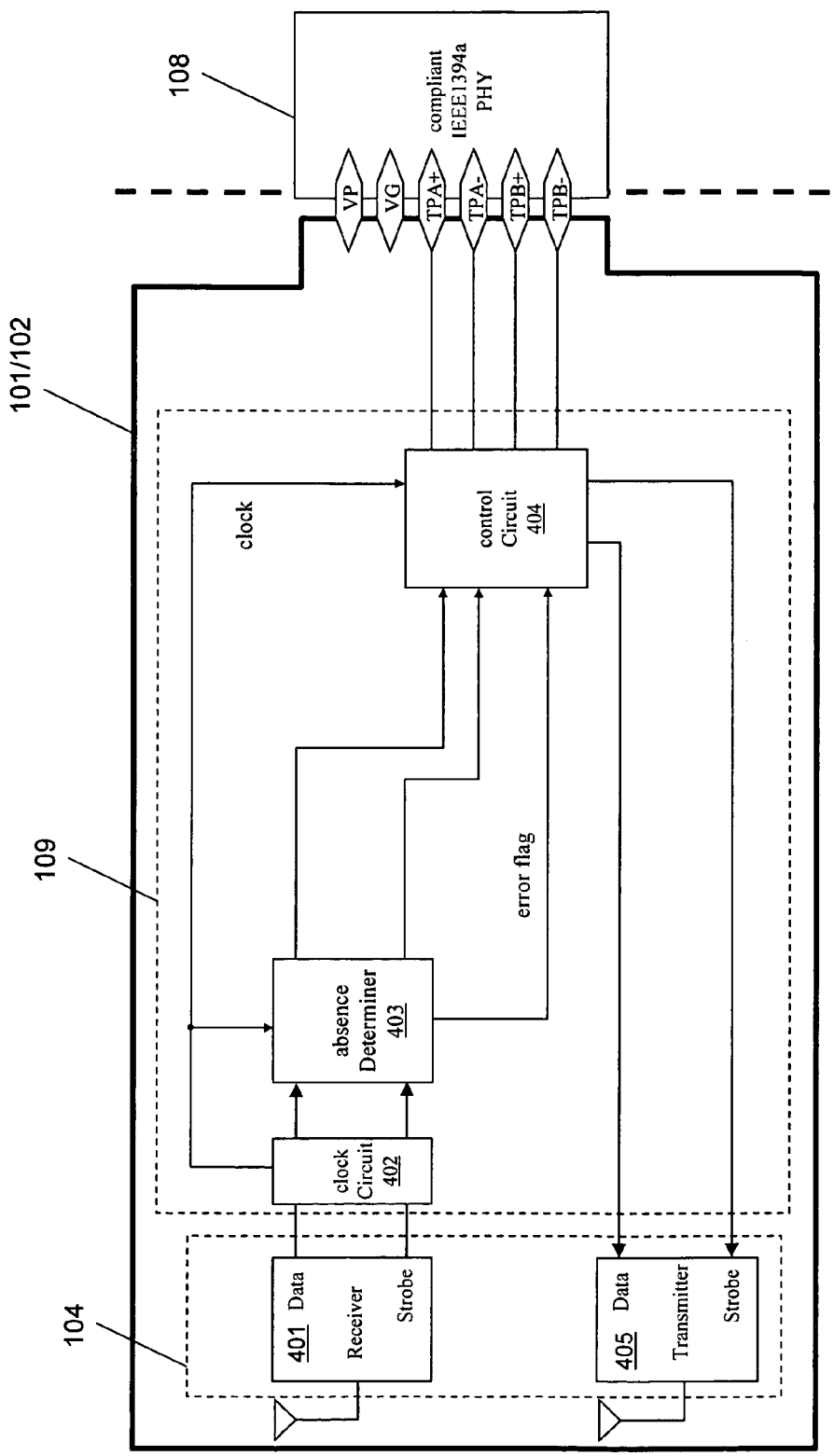
FIG. 4 is a more-detailed block diagram of the electronic devices of FIG. 1.

FIG. 4 is a more-detailed block diagram of devices 101 and 102. As shown, transceiver 104 comprises receiver 401 and transmitter 405, while circuitry 109 comprises clock 402, absence determiner 403, and control circuitry 404. During operation, an RF signal enters receiver 401 where data/strobe information is determined and passed to clock 402. Clock 402 determines a clock signal from the data/strobe information and passes a clocking signal along with data and strobe information to absence determiner 403. It should be noted that data and strobe information exiting IEEE device 108 will already be appropriately clocked and will not be re-clocked by control circuitry 404.

During operation, absence determiner 403 generates an error flag when an illegal transition occurs. Particularly, the data and strobe values are sequentially loaded into absence determiner 403, with determiner 401 decoding the data and strobe states to determine when illegal constellation transitions occur. Data/strobe information, as well as the error flag exit absence determiner 403 and are directed to control circuit 404. In the absence of valid data and strobe signal transitions, detected illegal constellation transitions change a state of the "error flag" from false to true. The transition of the "error flag" to a true state will instruct control circuit 404 to identify the data/strobe information as control information, while transition of the "error flag" to a false will identify the data/strobe information as data destined to a device (e.g., IEEE 1394 device).

It should be noted that when the "error flag" is true, control circuitry 404 will analyze the subsequent data/strobe transmissions to determine any action needed, and appropriately send out control signals via transmitter 405. For example, if unit 101 wishes to send a command to change RF operating frequency to unit 102, unit 101 would send a series of illegal constellation transitions to unit 102. The series of illegal constellation transitions will reach control circuitry 404 having an error flag=true.

After transmitting the series of illegal constellation transitions, unit 101 will begin transmitting control information to control circuitry 404. The control information comprises predefined control messages instructing control circuitry 404 to perform certain control-related tasks. For example, one control message would instruct control circuitry to change RF operating frequency of transceiver 104. Other messages would instruct control circuitry 404 to perform other tasks, such as, but not limited to indicate device attachment/detachment, and identify the signaling rate for data exchange, and suspend/resume modes.

When unit 101 has finished sending control information to unit 102, unit 101 will again transmit a series of illegal constellation transitions to unit 102, instructing control circuitry 404 that no further control information is to follow. Control circuitry 404 will then provide all subsequent data to the attached device. It should be noted that illegal constellation transitions are not necessarily the only means to end the transmission of control information; namely a command can be sent to resume normal operation.

Figure 5:
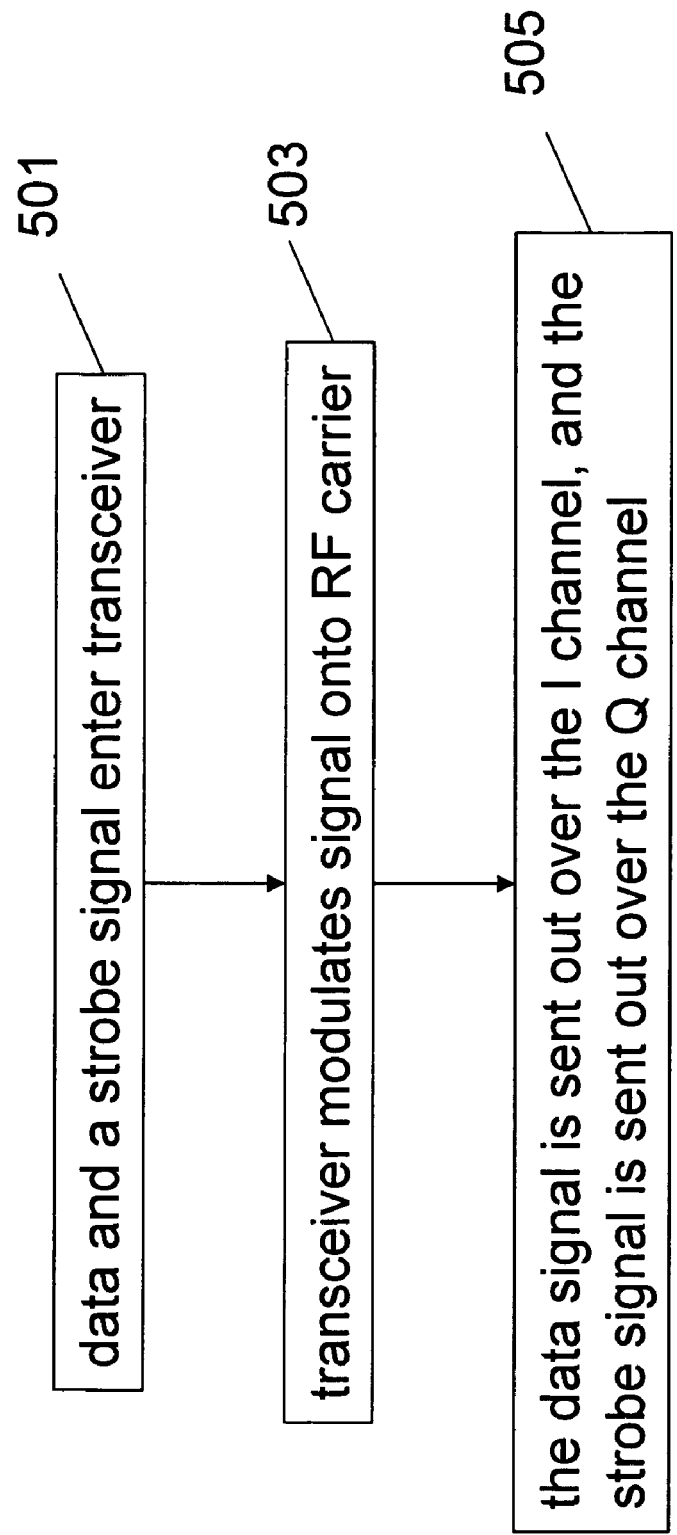
FIG. 5 is a flow chart showing operation of the transceiver of FIG. 1.

FIG. 5 is a flow chart showing operation of transceiver 104 during data transmission. The logic flow begins at step 501 where data and a strobe signals are received by transceiver 104. At step 503 the data and strobe signals are modulated onto an RF carrier. As discussed above, strobe information exits only on a Q channel and the data exists only on the I channel, or vice versa. Finally at step 505 the data signal is wirelessly sent out over the I channel, and the strobe signal is wirelessly sent out over the Q channel. It should be noted, that in alternate embodiments, the data signal may be sent out over the Q channel while the strobe signal is sent out over the I channel. It should be noted that transmissions may contain illegal constellation transitions as described in FIG. 6.

Figure 6:
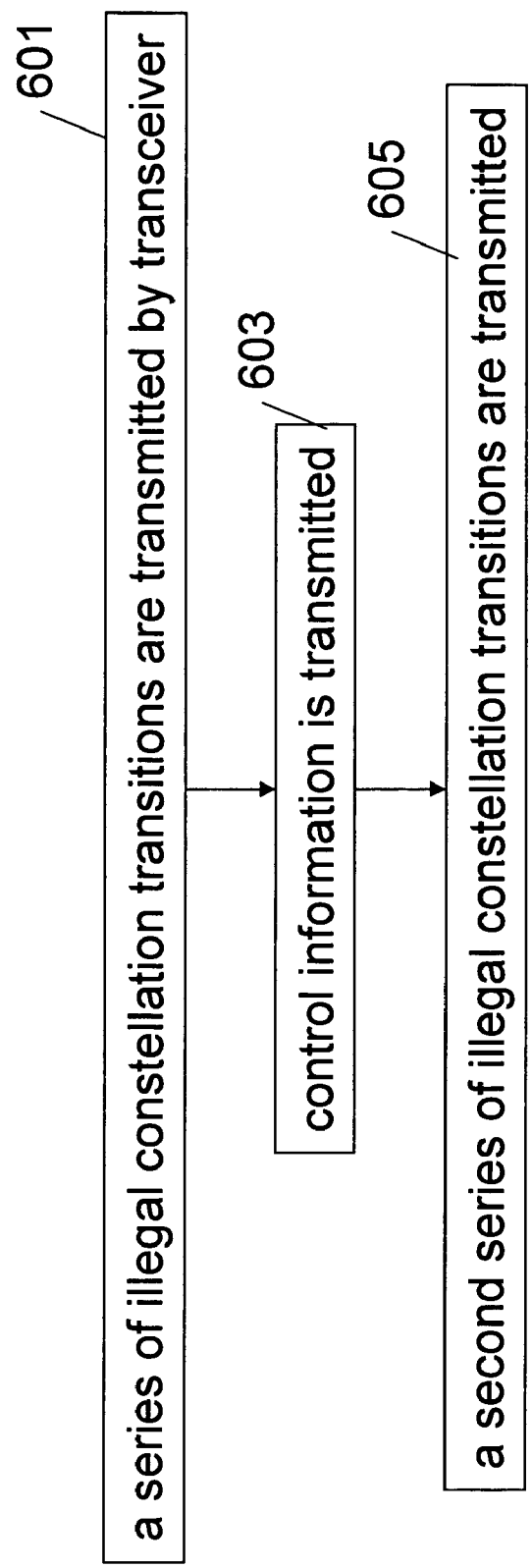
FIG. 6 is a flow chart showing operation of the transceiver of FIG. 1 during control signal transmission.

FIG. 6 is a flow chart showing operation of transceiver 104 during control signal transmission. The logic flow begins at step 601 where a series of illegal constellation transitions are transmitted by transceiver 104. As discussed above, the series of illegal constellation transitions indicate to the receiver that control information is to follow. The logic flow continues to step 603 where control information is transmitted, and then to step 605 where a second series of illegal constellation transitions are transmitted indicating that control information has ceased being transmitted. (Again, it should be noted that illegal constellation transitions are not necessarily the only means to end the transmission of control information; namely a command can be sent to resume normal operation.)

Figure 7:
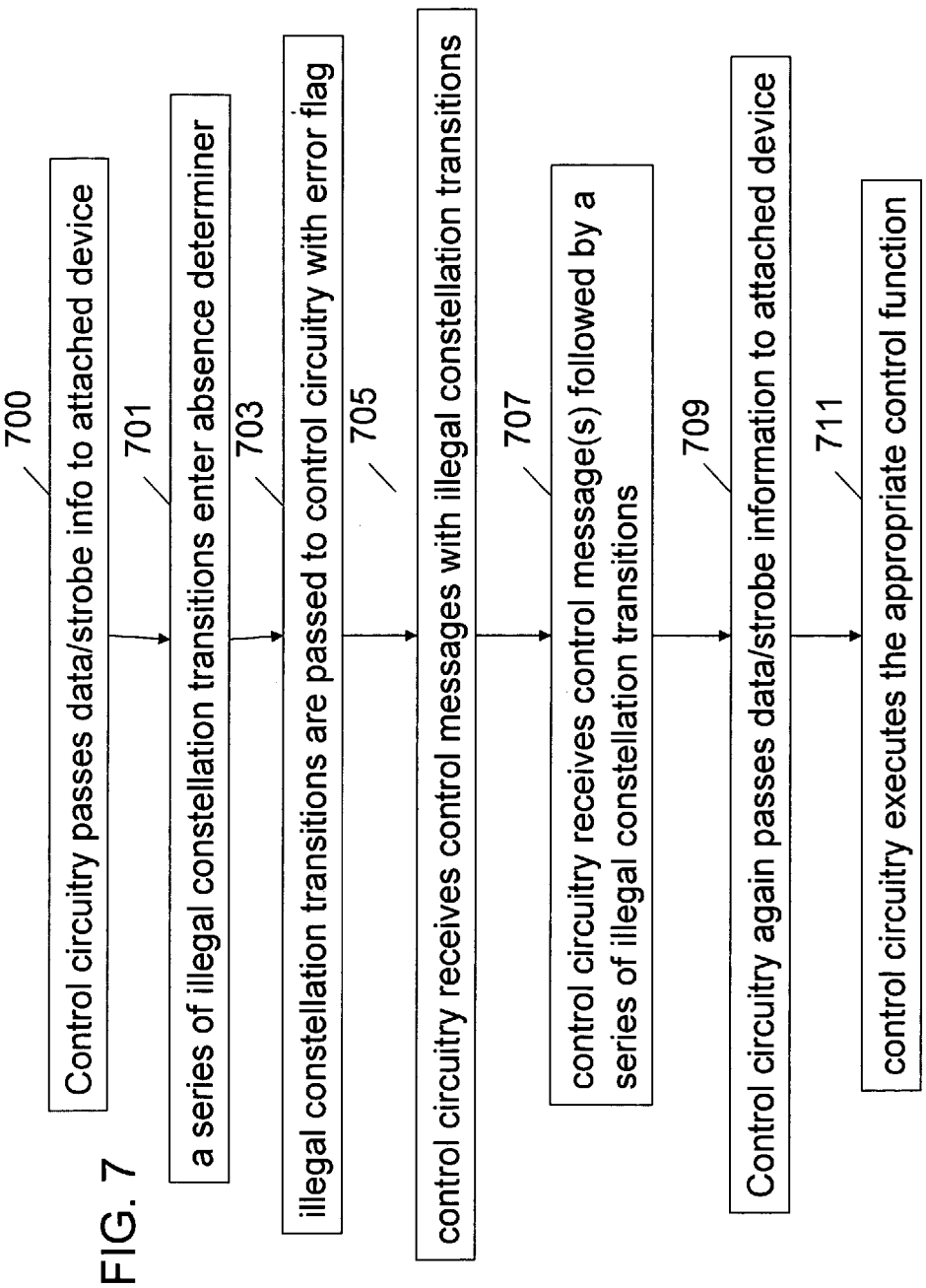
FIG. 7 is a flow chart showing operation of the transceiver of FIG. 1 during reception of control information.

FIG. 7 is a flow chart showing operation of transceiver 104 during reception of control information. The logic flow begins with control circuitry 404 passing data/strobe information to an attached device (step 700). At step 701 a series of illegal constellation transitions enter absence determiner 403. At step 703, illegal constellation transitions and an error flag are passed to control circuitry 404. The logic flow continues to step 705 where control circuitry 404 receives control message(s) followed by a series of illegal constellation transitions indicating an end to control data transmission. At step 709, control circuitry 404 again passes data/strobe information to attached circuitry until an error flag is again received from absence determiner 403. Finally at step 711, control circuitry 404 executes the appropriate control function.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for wirelessly transmitting data, the method comprising the steps of:
   receiving strobe information;
   receiving data;
   modulating the strobe information and the data such that the strobe information exists only on a Q channel and the data exists only on an I channel, or vice versa;
   intentionally transmitting illegal constellation transitions that are used to signal a pending exchange of interface management/control information; and
   wirelessly transmitting the interface management/control information after the transmission of the illegal constellation transitions.

2. The method of claim 1 wherein the step of modulating the strobe and the data comprises the step of using a modulation taken from a group consisting of QPSK, QAM, MSK, and GMSK modulation to modulate the strobe and the data such that the strobe information exists only on the Q channel and the data exists only on the I channel, or vice versa.

3. The method of claim 1 further comprising the steps of:
   transmitting a series of illegal constellation transitions, wherein the series of illegal constellation transitions indicate a control data has ceased being transmitted.

4. A method for receiving wirelessly-transmitted data, the method comprising the steps of:
   receiving modulated data/strobe information comprising an I and a Q channel transmitted over an over-the-air interface, wherein the data is contained only on the I channel and the strobe information is contained only on the Q channel, or vice versa;
   detecting an illegal constellation transition in the I channel and Q channel; wherein the detection of the illegal constellation transitions cause control circuitry to identify the data/strobe information as control information; and
   receiving the control data after the detection of the illegal constellation transition.

5. The method of claim 4 wherein the step of receiving the modulated information comprises the step of receiving QPSK, QAM, MSK, or GMSK modulated data.

6. An apparatus for receiving wirelessly-transmitted data, the apparatus comprising:
   a receiver having modulated data as an input, wherein the modulated data comprises an I channel containing only a data stream, and a Q channel containing only strobe information, or vice versa, the receiver additionally receiving illegal constellation transitions; and
   an absence determiner determining when an illegal constellation transition occurs wherein the illegal constellation transition causes a control circuitry to identify the data/strobe information as control information and wherein the receiver then receives the control information after receiving the illegal constellation transitions.

7. The apparatus of claim 6 wherein the modulated data comprises modulated data taken from a group consisting of QPSK, QAM, MSK, or GMSK modulated data.

\* \* \* \* \*